(12) United States Patent
Keskin et al.

(10) Patent No.: US 12,450,472 B2
(45) Date of Patent: Oct. 21, 2025

(54) CHARGE-PUMP-BASED CURRENT-MODE NEURON FOR MACHINE LEARNING

(71) Applicant: QUALCOMM Incorporated, San Diego, CA (US)

(72) Inventors: Mustafa Keskin, San Diego, CA (US); Ankit Srivastava, San Diego, CA (US); Sameer Wadhwa, San Diego, CA (US); Guoqing Miao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1158 days.

(21) Appl. No.: 17/353,564

(22) Filed: Jun. 21, 2021

(65) Prior Publication Data

US 2021/0397937 A1 Dec. 23, 2021

Related U.S. Application Data

(60) Provisional application No. 63/042,537, filed on Jun. 22, 2020.

(51) Int. Cl.
| | | |
|---|---|---|
| *G11C 11/54* | (2006.01) | |
| *G06N 3/063* | (2023.01) | |
| *G06N 3/08* | (2023.01) | |
| *G11C 5/14* | (2006.01) | |
| *H03M 1/66* | (2006.01) | |

(52) U.S. Cl.
CPC .............. *G06N 3/063* (2013.01); *G06N 3/08* (2013.01); *G11C 5/145* (2013.01); *G11C 11/54* (2013.01); *H03M 1/66* (2013.01)

(58) Field of Classification Search
CPC .......... G06N 3/063; G06N 3/08; G06N 3/065; G06N 3/04; G06N 20/00; G11C 5/145; G11C 11/54; G11C 7/1006; H03M 1/66
USPC .............................................. 365/189.05, 226
See application file for complete search history.

(56) References Cited

U.S. PATENT DOCUMENTS

| | | | | |
|---|---|---|---|---|
| 6,525,896 B2 * | 2/2003 | Chung | ................. | H03K 17/102 360/68 |
| 10,402,720 B2 | 9/2019 | Annapureddy | | |
| 2008/0094127 A1* | 4/2008 | Betser | ................... | H02M 3/073 327/536 |
| 2008/0309539 A1* | 12/2008 | Baker | ..................... | H03M 3/39 365/207 |

(Continued)

FOREIGN PATENT DOCUMENTS

| | | |
|---|---|---|
| CN | 108629407 A | 10/2018 |
| CN | 109478249 A | 3/2019 |

(Continued)

OTHER PUBLICATIONS

Taiwan Search Report—TW110122734—TIPO—Feb. 8, 2025.

(Continued)

*Primary Examiner* — Michael T Tran
(74) *Attorney, Agent, or Firm* — Loza & Loza LLP

(57) ABSTRACT

A compute-in-memory array is provided in which each neuron includes a capacitor and an output transistor. During an evaluation phase, a filter weight voltage and the binary state of an input bit controls whether the output transistor conducts or is switched off to affect a voltage of a read bit line connected to the output transistor.

28 Claims, 15 Drawing Sheets

(56) References Cited

U.S. PATENT DOCUMENTS

| | | | |
|---|---|---|---|
| 2016/0043636 A1* | 2/2016 | Bass | H03L 7/0891 |
| | | | 327/536 |
| 2017/0142356 A1* | 5/2017 | Deng | H04N 25/531 |
| 2018/0047454 A1* | 2/2018 | Tran | G11C 16/26 |
| 2019/0311244 A1 | 10/2019 | Oh et al. | |
| 2019/0311749 A1 | 10/2019 | Song et al. | |
| 2019/0370640 A1* | 12/2019 | Peng | G11C 11/413 |
| 2020/0356344 A1* | 11/2020 | Cruz-Albrecht | G06N 3/065 |
| 2021/0142854 A1* | 5/2021 | Tran | G06N 3/065 |
| 2021/0143000 A1* | 5/2021 | Pandurangan | H01J 49/4215 |
| 2021/0143828 A1* | 5/2021 | Sarin | H03M 1/0602 |
| 2021/0264243 A1* | 8/2021 | Sarin | G06N 3/065 |
| 2024/0128978 A1* | 4/2024 | Sarin | H03M 1/1057 |

FOREIGN PATENT DOCUMENTS

| | | |
|---|---|---|
| TW | I677827 B | 11/2019 |
| TW | 202011281 A | 3/2020 |

OTHER PUBLICATIONS

Horio Y., et al., "Active Analog Memories for Neuro-Computing", Proceedings of the International Symposium on Circuits and Systems, New Orleans, May 1-3, 1990, [Proceedings of the International Symposium on Circuits and Systems], New York, IEEE, US, vol. 4 of 04, May 1, 1990 (May 1, 1990), pp. 2986-2989, XP000164166, The whole document.
International Search Report and Written Opinion—PCT/US2021/038513—ISA/EPO—Sep. 23, 2021.

* cited by examiner

CHARGE-PUMP-BASED CURRENT-MODE NEURON FOR MACHINE LEARNING

CROSS-REFERENCE TO RELATED APPLICATIONS

This application claims the benefit of U.S. Provisional Application No. 63/042,537, filed Jun. 22, 2020, the contents of which are hereby incorporated by reference in their entirety.

TECHNICAL FIELD

This application relates to compute-in-memories, and more particularly to a charge-pumped-based current-mode compute-in-memory bitcell (neuron) for machine learning applications.

BACKGROUND

Computer processing of data typically uses a Von Neumann architecture in which the data is retrieved from a memory to be processed in an arithmetic and logic unit. In computation-intensive applications such as machine learning, the data flow to and from the memory becomes a bottleneck for processing speed. To address this data-movement bottleneck, compute-in-memory architectures have been developed in which the data processing hardware is distributed across the bitcells.

SUMMARY

In accordance with an aspect of the disclosure, a memory for machine learning is provided that includes: a bias circuit; a bit line; and a neuron including: an output transistor having a drain connected to the bit line; a filter weight capacitor; a digital-to-analog converter; a first switch coupled between the bias circuit and the filter weight capacitor; a second switch coupled between the digital-to-analog converter and the filter weight capacitor; and a third switch coupled between the filter weight capacitor and a gate of the output transistor.

In accordance with another aspect of the disclosure, a memory for machine learning is provided that includes: a read bit line; an output transistor having a drain connected to the read bit line; a charge pump capacitor; a filter weight capacitor; a voltage source; and a set of switches having a first switching configuration in which the filter weight capacitor is charged by the voltage source and having a second switching configuration in which the filter weight capacitor is coupled to the charge pump capacitor to provide a boosted voltage to a gate of the output transistor.

In accordance with yet another aspect of the disclosure, a memory for machine learning is provided that includes: a plurality of neurons, each neuron including: a bit line; a bit line switch; and an output transistor having a terminal connected to the bit line through the bit line switch; and a bias circuit including: a charge source and a switch matrix configured to couple the charge source to a selected one of the neurons to charge a gate capacitance in the output transistor of the selected one of the neurons with a boosted voltage.

Finally, in accordance with another aspect of the disclosure, a method of operation for a neuron is provided that includes: driving a current through a diode-connected transistor to charge a charge pump capacitor to a charge pump voltage; responsive to a training data set, adjusting a voltage digital-to-analog converter (VDAC) to charge a filter weight capacitor with a VDAC voltage; responsive to a first binary value of an input bit, coupling the charge pump capacitor and the filter weight capacitor in series to charge a gate of an output transistor to a sum of the VDAC voltage and the charge pump voltage; and conducting a mirrored version of the current through the output transistor responsive to the charging of the gate of the output transistor.

These and other advantageous features may be better appreciated through the following detailed description.

BRIEF DESCRIPTION OF THE DRAWINGS

Implementations of the present disclosure and their advantages are best understood by referring to the detailed description that follows. It should be appreciated that like reference numerals are used to identify like elements illustrated in one or more of the figures.

DETAILED DESCRIPTION

Figure 1A:
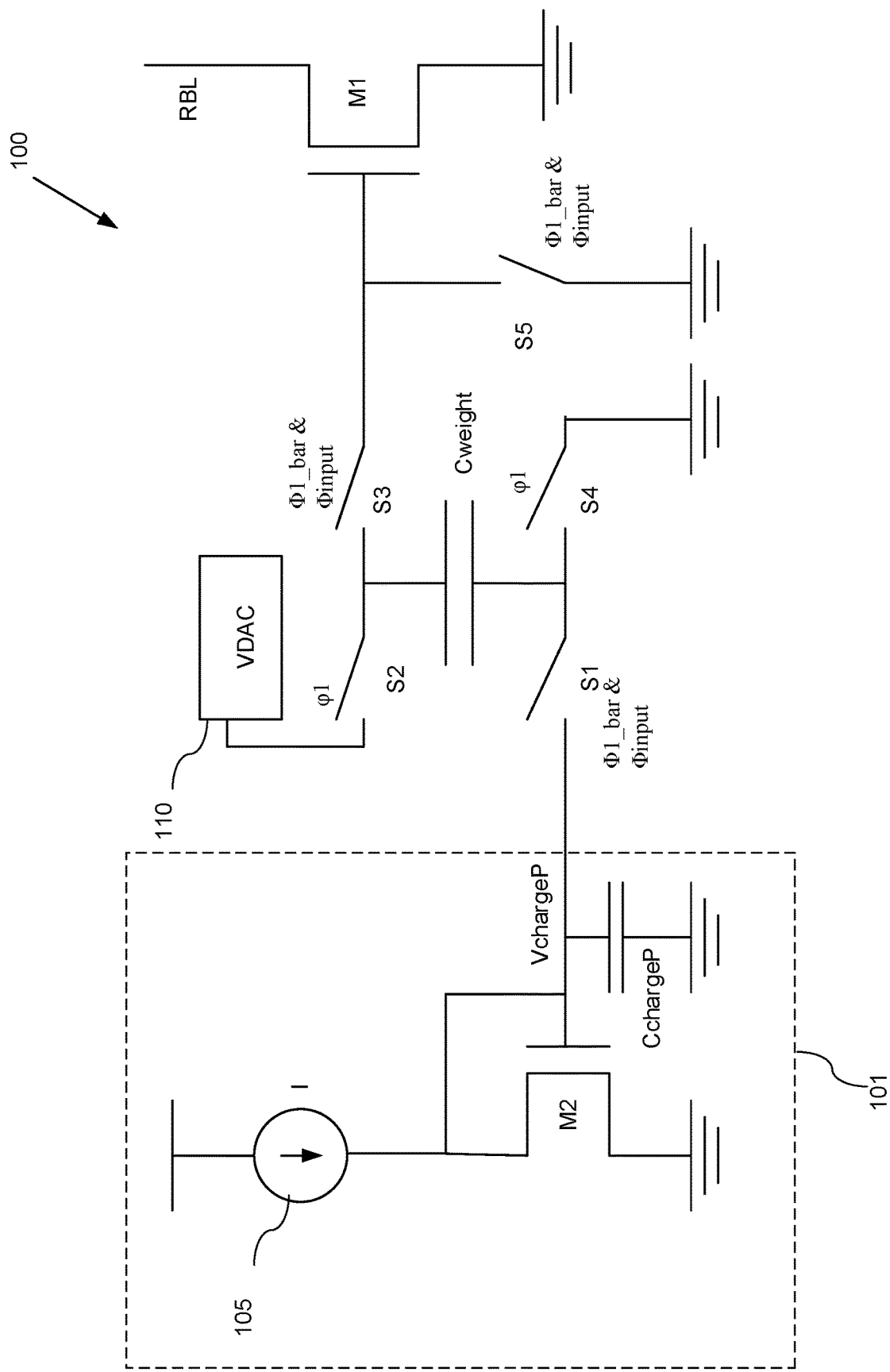
FIG. 1A illustrates a charge-pump-based current-mode neuron and a bias circuit in accordance with an aspect of the disclosure.

It is cumbersome to use a traditional Von Neumann architecture for machine learning applications as data flow to and from the memory becomes a bottleneck to increasing the processing speed. Compute-in-memory architectures have thus been developed in which the data processing hardware is distributed across the bitcells or neurons. For example, it is conventional for each layer of a machine learning application to implement one or more filters. A filter is a multiply-and-accumulate circuit that multiplies a plurality of filter weights with a corresponding plurality of input bits and that sums (accumulates) the results of the multiplications. Each filter weight is stored by a compute-in-memory neuron that also functions to multiple the stored filter weight with an input bit from an input vector. A particularly advantageous compute-in-memory neuron is disclosed that includes a filter weight capacitor for storing the filter weight. During a training phase in some implementations, a first plate of the filter weight capacitor is charged to an analog filter weight voltage while a second plate of the filter weight capacitor is discharged to ground. Depending upon the training, the analog filter weight is adjusted to the appropriate value. For example, a voltage source such as a voltage digital-to-analog-converter (VDAC) may generate the analog filter weight voltage. A validation phase may then follow the training phase in which the analog filter weight voltage is not changed further.

With the neurons trained and validated so that each neuron's filter weight capacitor is charged to the appropriate filter weight voltage, the neural network may then process data in what is commonly denoted as a computation or prediction phase. To provide a bias to each neuron in a layer, a charge pump capacitor may couple to the second plate of the filter weight capacitor while the top plate of the filter weight capacitor couples to a gate of an output capacitor having a drain or source terminal coupled to a read bit line. The charge pump capacitor may be part of a bias circuit that may bias other neurons as well. The bias circuit may thus also be denoted herein as a common bias circuit since it is shared across multiple neurons. In a charging stage of the training phase, a current source in the common biasing block drives current into a drain of a diode-connected transistor. A gate of the diode-connected transistor couples to the charge pump capacitor. The charge pump capacitor will thus charge to a charge pump voltage (VchargeP) during the charging stage. A similar charging stage may occur in the computation phase. With the charging stage completed, the training phase may proceed to an evaluation stage in which the charge pump capacitor is then coupled to the second plate of the filter weight capacitor resulting in a serial stacking or combination of the filter weight capacitor and the charge pump capacitor. The filter weight capacitor is thus pumped in a charge pump fashion to be charged to a sum of the filter weight voltage and the charge pump voltage during the evaluation stage. A similar evaluation stage occurs after the charging stage during the computation phase. The difference between the two evaluation stages is that the training phase is responsive to training data whereas new data is processed during the computation phase. In both evaluation stages, the neuron is responsive to a binary value of an input bit. Depending upon this binary value, the first plate of the filter weight capacitor is either coupled to or isolated from a gate of an output transistor having a drain coupled to a bit line.

Should the input bit have a binary value such that the first plate of the filter weight capacitor is coupled to the gate of the output transistor, the output transistor and the diode-connected transistor form a current mirror. The output transistor will thus conduct a mirrored current through the bit line that will vary depending on the VDAC voltage. This current variation exists with respect to a bias current established by the current source current. For example, suppose that the VDAC has a two-bit resolution. The current mirrored into the bit line will then have four possible values depending upon the resulting VDAC voltage established during the training phase. Given this current mirroring and use of a charge pump capacitor, the neurons disclosed herein may be denoted as charge-pump-based current-mode neurons.

The neurons as just described include the filter weight capacitor and a plurality of switches for the charging of the filter-weight capacitor. Each switch may be implemented by a corresponding transistor switch. A neuron may thus include several transistors for the switches (e.g., 4 or five switch transistors) as well as the filter weight capacitor and the output transistor. Such a collection of transistors is comparable in number to a conventional static random-access memory based (SRAM-based) compute-in-memory bitcell. Note, however, that the number of filter weight bits that would need to be stored by a comparable SRAM-based implementation of the neuron depends upon the number of bits for each filter weight. If each filter weight is four bits, four SRAM bitcells are necessary to store the filter weight. But the filter weight for the charge-pump-based current-mode neurons disclosed herein may be implemented by the VDAC resulting in a substantial increase in density (the semiconductor area necessary for the implementation of a given neuron).

The bit line coupled to the drain of the output transistor is also denoted herein as a read bit line. A pre-charging of the read bit line depends upon a polarity of the output transistor. If the output transistor is an n-type metal-oxide semiconductor (NMOS) transistor, the read bit line may be pre-charged by being charged to the power supply voltage. If the output transistor is a p-type metal-oxide semiconductor (PMOS) transistor, the read bit line may be pre-charged by being discharged. In other implementations, the read bit line may be pre-charged to an intermediate voltage that is between ground and the power supply voltage.

Some example implementations of a compute-in-memories formed with charge-pump-based current-mode neurons will now be discussed in more detail. An example neuron 100 and an associated bias circuit 101 is shown in FIG. 1A. Neuron 100 includes a filter weight capacitor (Cweight), an NMOS output transistor M1, and a set of five transistor switches S1, S2, S3, S4, and S5. Switch S1 couples between a second plate of the filter weight capacitor and a VchargeP output node of bias circuit 101. Switch S2 couples between an output of a voltage digital-to-analog converter (VDAC) 110 and a first plate of the filter weight capacitor. Switch S3 couples between the first plate of the filter weight capacitor and a gate of the output transistor M1. Switch S4 couples between the second plate of the filter weight capacitor and ground. Finally, switch S5 couples between the gate of the output transistor M1 and ground. A source of the output transistor M1 is connected to ground whereas a drain of output transistor M1 is connected to a read bit line (RBL).

The state of the transistor switches depends upon the operating mode. As discussed above, the neurons in a neural network are trained during a training phase to establish the filter weight value for the trained neurons. The training is then evaluated during a validation phase. Although the filter weights are not changed during the validation phase, the neural network may be tuned such as through the deletion of a hidden layer during the validation phase. With the neural network trained and validated, the neural network may be used to process input data during the computation phase (which is also denoted as a prediction phase herein). During a charging stage of the training phase, a control signal φ1 controls the state of switches S1 and S4 whereas a complement (φ1_bar) of the control signal φ1 controls switches S1, S3, and S5. During an evaluation stage of the training phase and of the computation phase, switches S1 and S3 are controlled by a data control signal φinput that is asserted when an input bit has a binary true state. During the evaluation stage, switch S5 is controlled by a complement of the data control signal φinput that is asserted when the input bit has a binary false state. These switching states (which may also be denoted as switching configurations) will now be discussed in more detail.

Figure 1B:
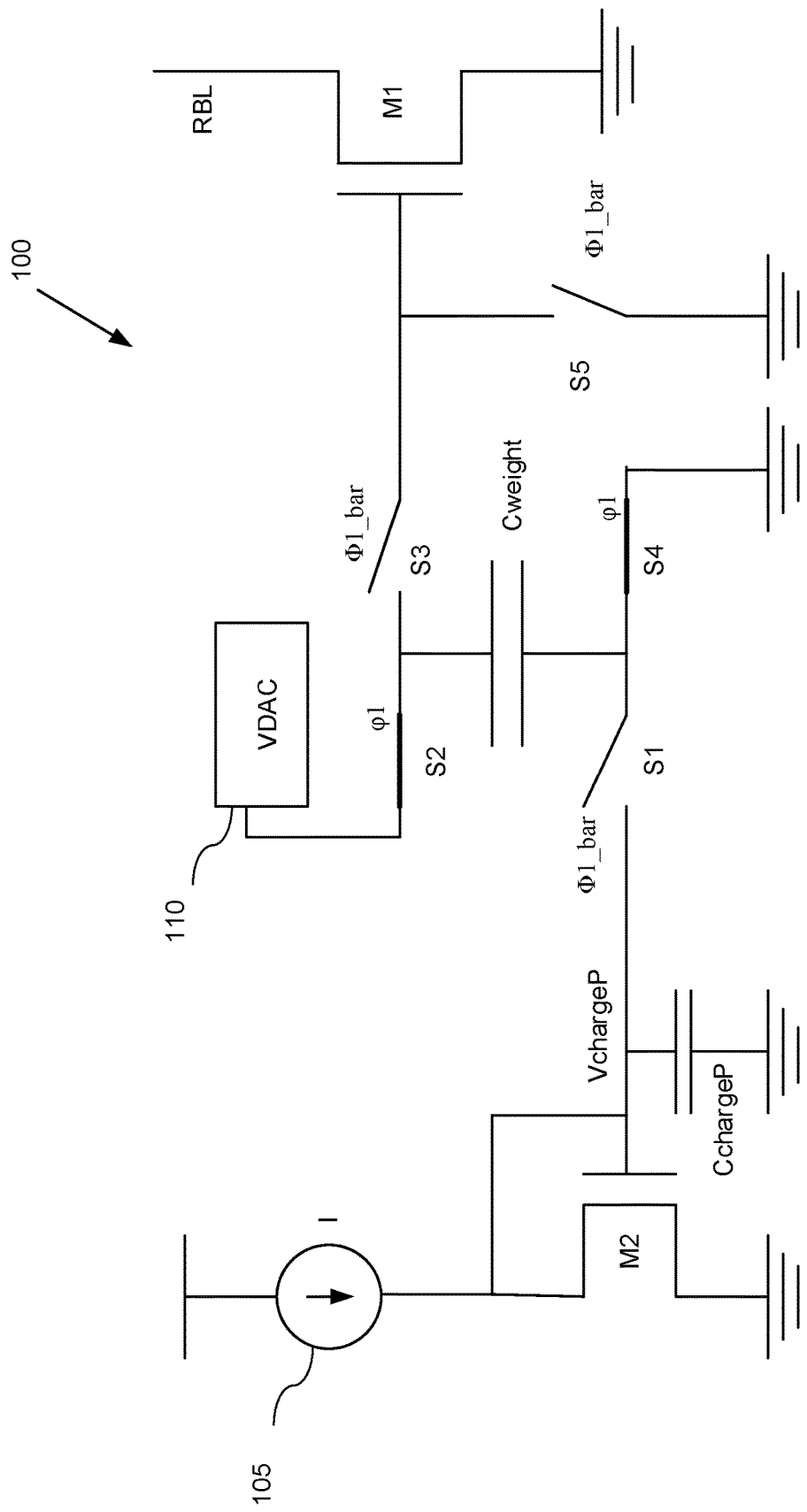
FIG. 1B illustrates a switching configuration for the neuron of FIG. 1A during a charging stage of a training phase and also during a refresh stage of a computation phase in accordance with an aspect of the disclosure.

The switching states for switches S1 through S5 depend upon whether neuron 100 is in the training phase, the validation phase, or the computation phase. The switching state for neuron 100 during the charging stage of the training phase (or of the computation phase) is shown in FIG. 1B. Switches S2 and S4 are closed in response to the assertion of the control signal φ1. Switches S1, S3, and S5 are open in response to a de-assertion of the complement control signal φ1_bar. This switching configuration for the set of switches may be denoted herein as a first switching configuration. With switches S2 and S4 closed, VDAC 110 charges the filter weight capacitor to the filter weight voltage Vdac that depends upon the neuron training. In bias circuit 101, a current source I drives a bias current I into a drain of a diode-connected NMOS transistor M2 having a source connected to ground. A charge pump capacitor (CchargeP) has a second plate connected to ground and a first plate connected to the gate of the diode-connected transistor M2. In response to the current I, the gate of the diode-connected transistor M2 and the charge pump capacitor are charged to a charge pump voltage VchargeP.

Figure 1C:
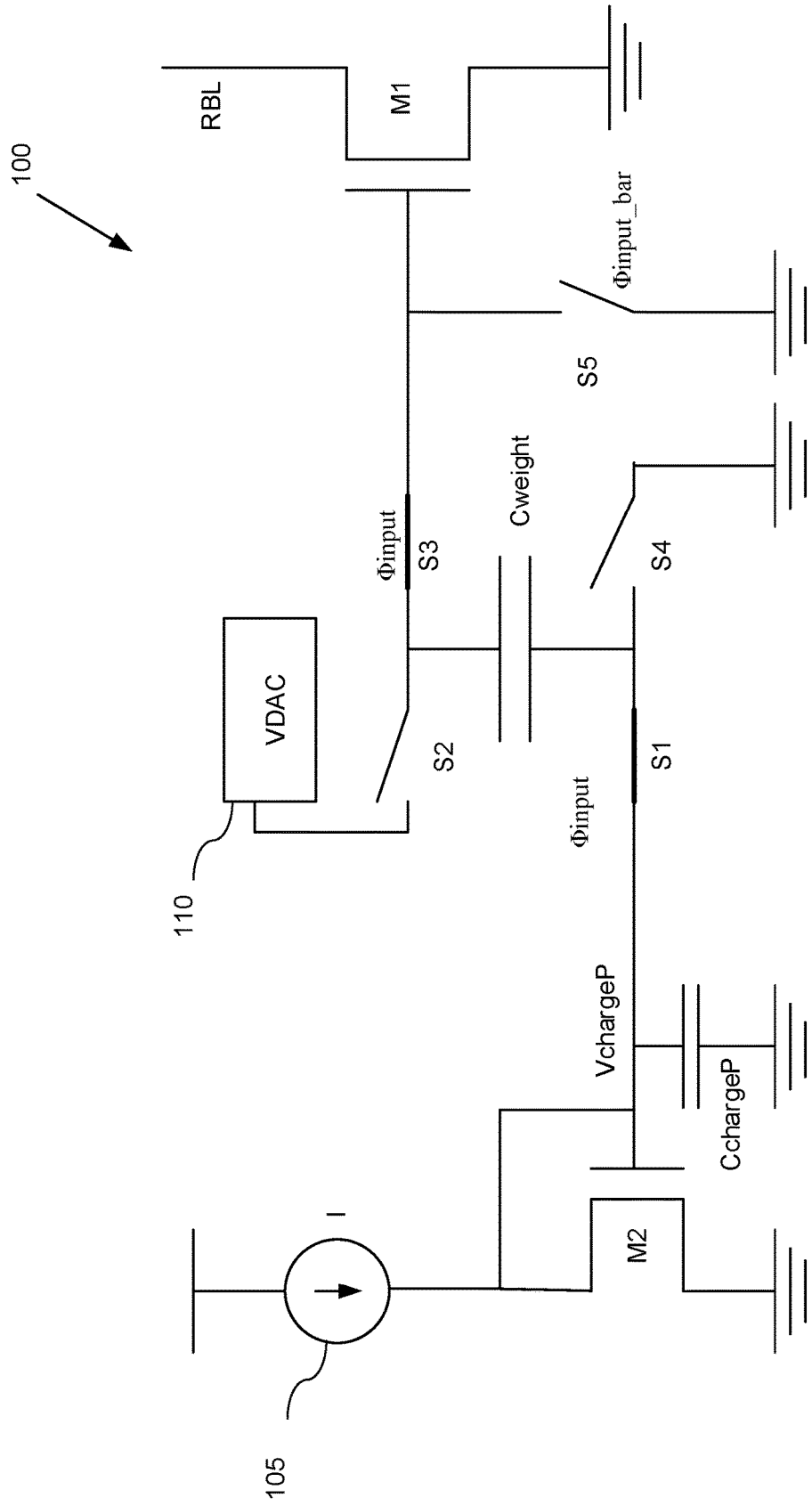
FIG. 1C illustrates a switching configuration for the neuron of FIG. 1A during an evaluation stage of either a training phase or a computation phase responsive to a first binary value for an input bit in accordance with an aspect of the disclosure.

The switch configuration for compute-in-memory neuron 100 during an evaluation stage of the training phase depends upon whether the input bit (φinput) of a training data set is binary true or false. The same switch configuration behavior exists during the evaluation stage of the computation phase with respect to its input bit. The following discussion will assume the input bits are active-high, but an active-low convention may also be used. A switching configuration for the set of switches in neuron 100 in response to a binary high state for an input training bit during the evaluation stage of the training phase (or of the computation phase) is shown in FIG. 1C. This switching configuration may also be denoted as a second switching configuration herein. In response to the high state of the input bit φinput, switches S1 and S3 close. The control signal φ1 is de-asserted during the evaluation stage so that switches S2 and S4 are open. Switch S5 is responsive to a complement φinput_bar of the input bit during the evaluation stage. Since the input bit is asserted high in FIG. 1C, switch S5 is opened. As discussed earlier, the charge pump capacitor is charged to the charge pump voltage VchargeP during the charging stage. With switch S1 closed during the subsequent evaluation stage, a first plate of the filter weight capacitor is thus boosted in a charge-pump fashion to a boosted voltage (a sum of the filter weight voltage Vdac and VchargeP) due to the serial coupling of the filter weight and charge pump capacitors. This boosted voltage drives the gate of the output transistor M1 through the closed switch S3. The charge pump capacitor and the filter weight capacitor are thus stacked in series in response to the input bit being true. Depending upon the values of the Vdac and VchargeP voltages, the output transistor M1 conducts a current-mirror-adjusted version of the current I during the evaluation portion to reduce the read bit line voltage accordingly. For example, if the Vdac voltage is zero, the gate of the output transistor M1 is charged to the VChargeP voltage. Prior to the training phase, the read bit line voltage was pre-charged to the power supply voltage or to a fraction of the power supply voltage. Depending upon the value of the Vdac voltage (which represents the filter weight), the bit line is discharged accordingly to equal some analog value.

Figure 1D:
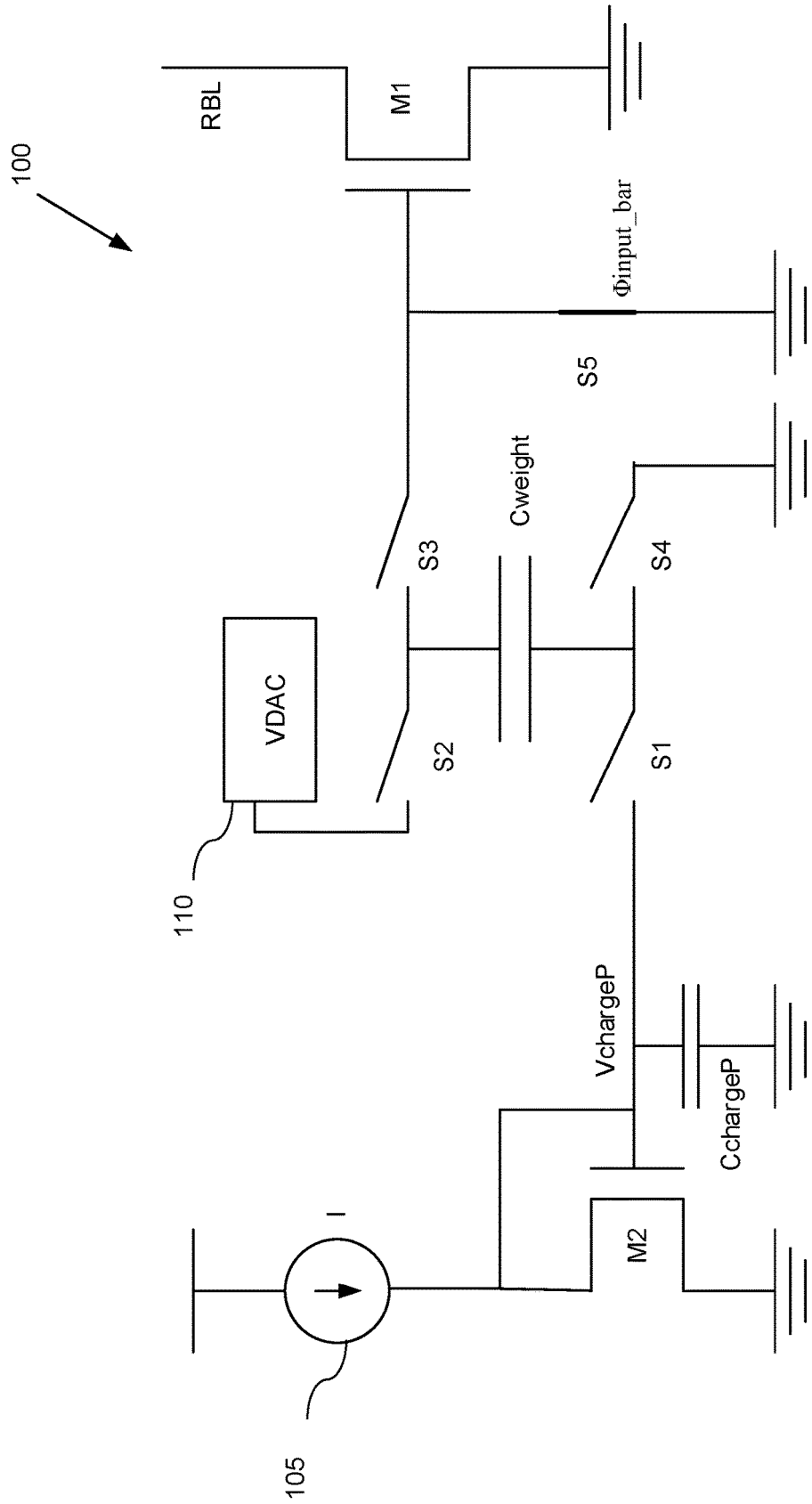
FIG. 1D illustrates a switching configuration for the neuron of FIG. 1A during an evaluation stage of either a training phase or a computation phase responsive to a second binary value for an input bit in accordance with an aspect of the disclosure.

The input bit during the evaluation stage may also have a binary false (binary low value) during either the training phase or the computation phase. A switching configuration for neuron 100 in response to such a binary low state of the input bit during the evaluation stage is shown in FIG. 1D. This switching configuration may also be denoted herein as a third switching configuration. Since the input bit has a binary low value, the complement input bit (φinput) is binary high such that switch S5 is closed to ground the gate of output transistor M1 and switches S1, S2, S3, and S4 are opened. The read bit line thus floats if the input bit is low. The read bit line then remains at its pre-charged voltage.

Figure 2:
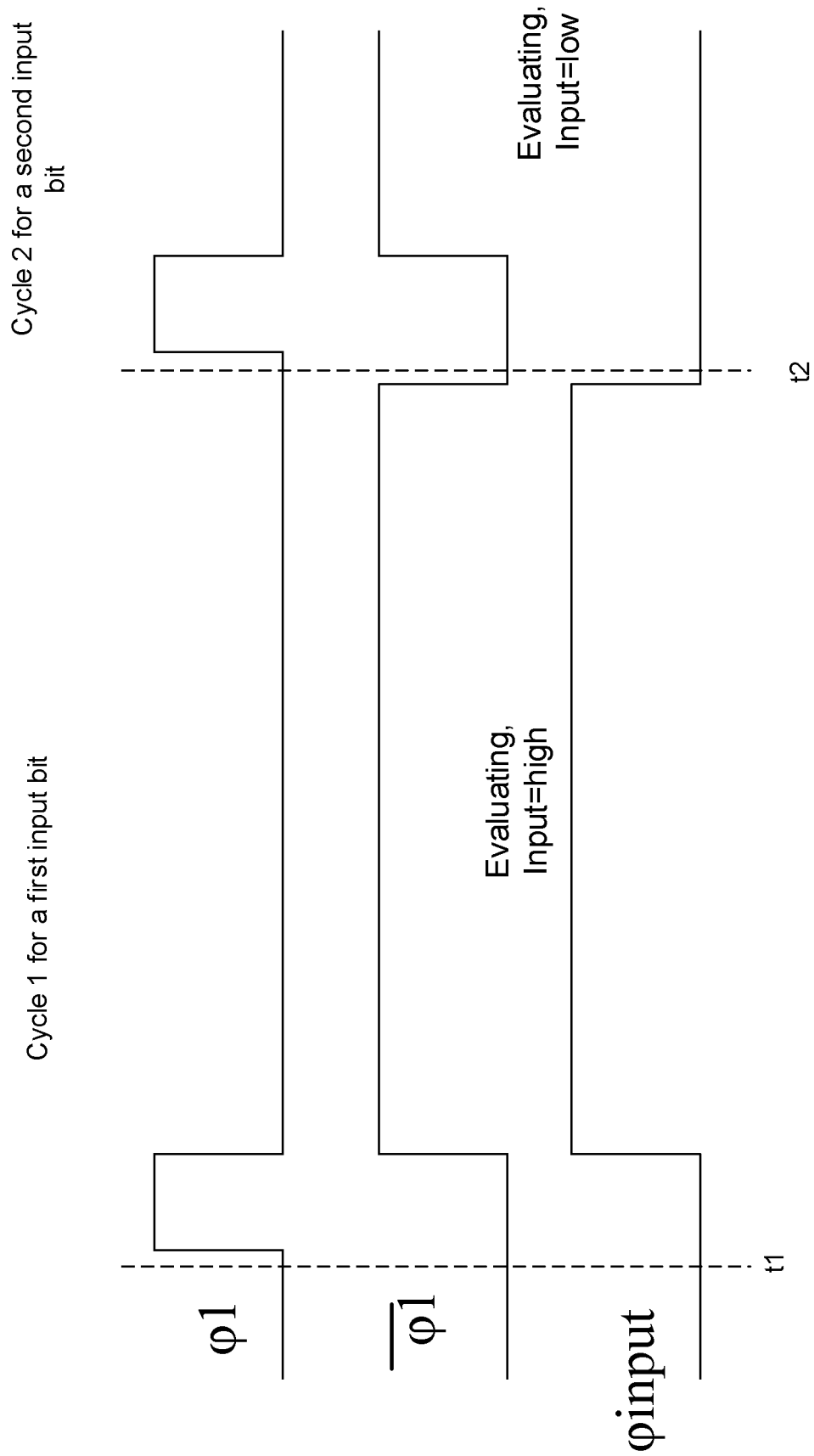
FIG. 2 illustrates some operating waveforms for the neuron of FIG. 1A during the training phase or during the computation phase in accordance with an aspect of the disclosure.

As the training or input data flows through neuron 100, sequential charging and evaluation portions occur as shown in the waveforms of FIG. 2. In particular, a first input bit from the training data (or the input data during the computation phase) is evaluated during a first cycle (cycle 1) that begins at a time t1 with the pulsing of the control signal φ1 during the charging stage of cycle 1. Neuron 100 would then be in the first switching configuration as discussed with regard to FIG. 1B. Following the charging stage, the control signal φ1 is de-asserted to begin the evaluation stage of cycle 1. In the evaluation stage of cycle 1, the input bit (φinput) is binary high so that neuron 100 would be in the second switching configuration as discussed with regard to FIG. 1C. Similarly, a second training bit is evaluated during a second training cycle (cycle 2) beginning at a time t2. Cycle 2 also begins with a charging stage in which the control signal φ1 is asserted. In the evaluation portion of cycle 2, the input training bit is low so that neuron 100 would be in the third switching configuration as discussed with regard to FIG. 1D.

During a computation phase, the machine learning application that includes neuron 100 processes input data. As the data works its way through the various layers to reach the layer containing neuron 100, an input bit will be received by neuron 100 that will be processed with the Vdac voltage stored on the filter weight capacitor. If the filter weight capacitor had no leakage, there would be no need of a charging phase to refresh the Vdac voltage on the filter weight capacitor prior to its processing with the input bit. But to address any such leakage, the computation phase may begin with a charging stage (which may also be denoted as a refresh stage as shown in FIG. 2. The control signal φ1 and the complement control signal φ1 operate as discussed with regard to FIG. 1B during this charge refresh stage so that the filter weight capacitor voltage Vdac and the charge capacitor voltage VchargeP may be refreshed. Should the input bit have a logic high state following the refresh charge, neuron 100 would be in the second switching configuration so that gate of the output transistor M1 is charged to the sum of the Vdac and VChargeP voltages. Conversely, should the input bit be low following the refresh, neuron 100 would be in the third switching configuration such that read bit line floats (remaining in its pre-charged state).

Figure 3:
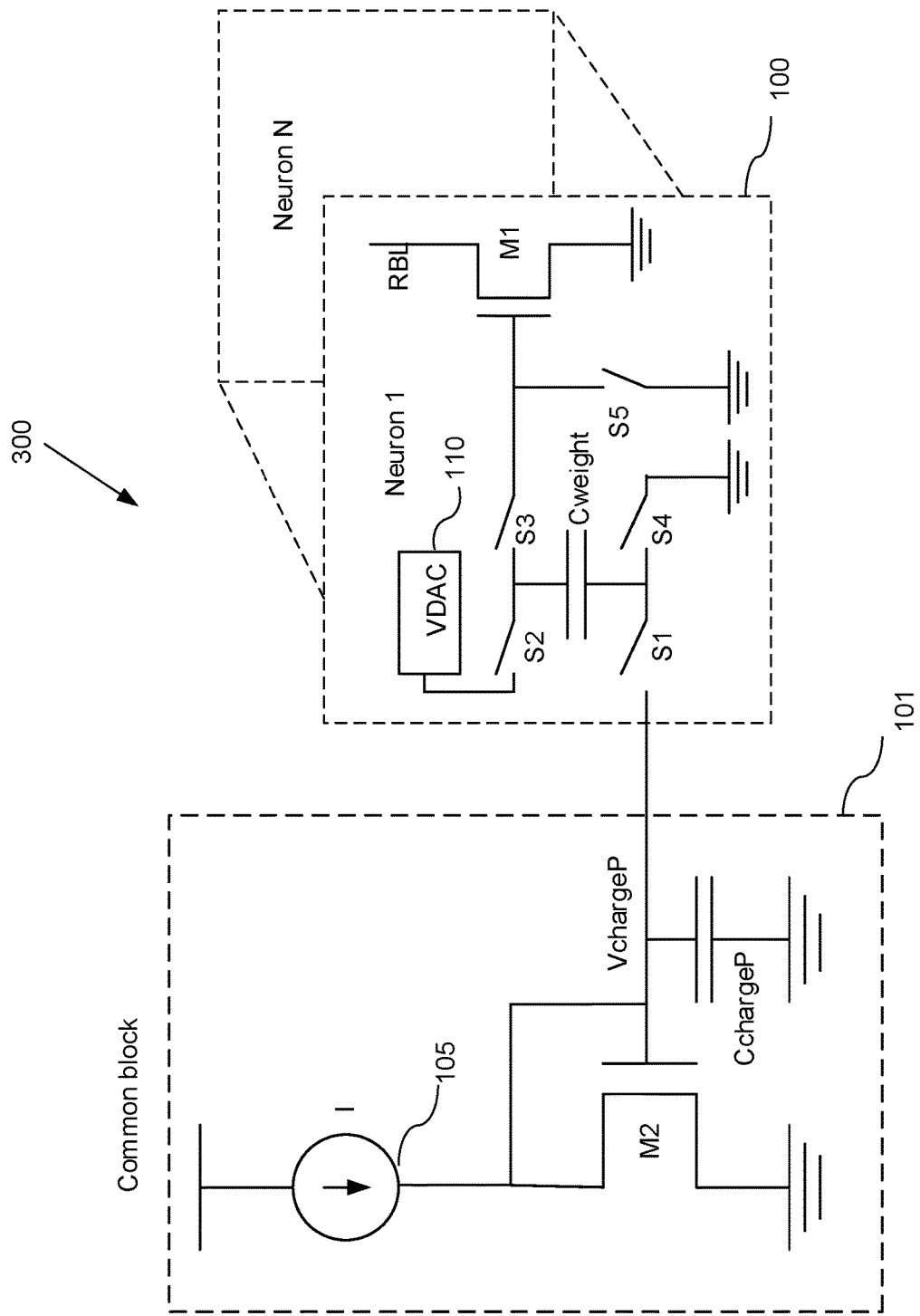
FIG. 3 illustrates an array of charge-pump-based current-mode neurons that are biased by a common bias circuit in accordance with an aspect of the disclosure.

To increase density, a bias circuit 101 may be common to a plurality of neurons 100 in a compute-in-memory array 300 as shown in FIG. 3. The VchargeP voltage may be common to the plurality of neurons 100 or may be changed for each neuron 100. Depending upon the training, the Vdac voltage for each neuron 100 is set. Depending upon its input bit, each neuron may either discharge or float its read bit line. The size (width in bits) of each filter weight depends upon the VDAC resolution. It is common for a filter weight to be either four bits or eight bits wide in typical applications although this value may be decreased or increased in alternative implementations. Note that an SRAM implementation of such filter weights requires four or eight bitcells, respectively. Yet in each neuron 100, the function of these four or eight bitcells may be performed using just the five transistor switches S1 through S5, the output transistor, and the filter weight capacitor. A multiple-bit filter weight implementation for neurons 100 thus provides a substantial increase in density compared to an SRAM implementation. Even if the filter weight is just one bit, neuron 100 is still comparable in density to a conventional SRAM bitcell. In addition, neurons 100 require no individual matching other than conventional analog circuity matching.

Figure 4:
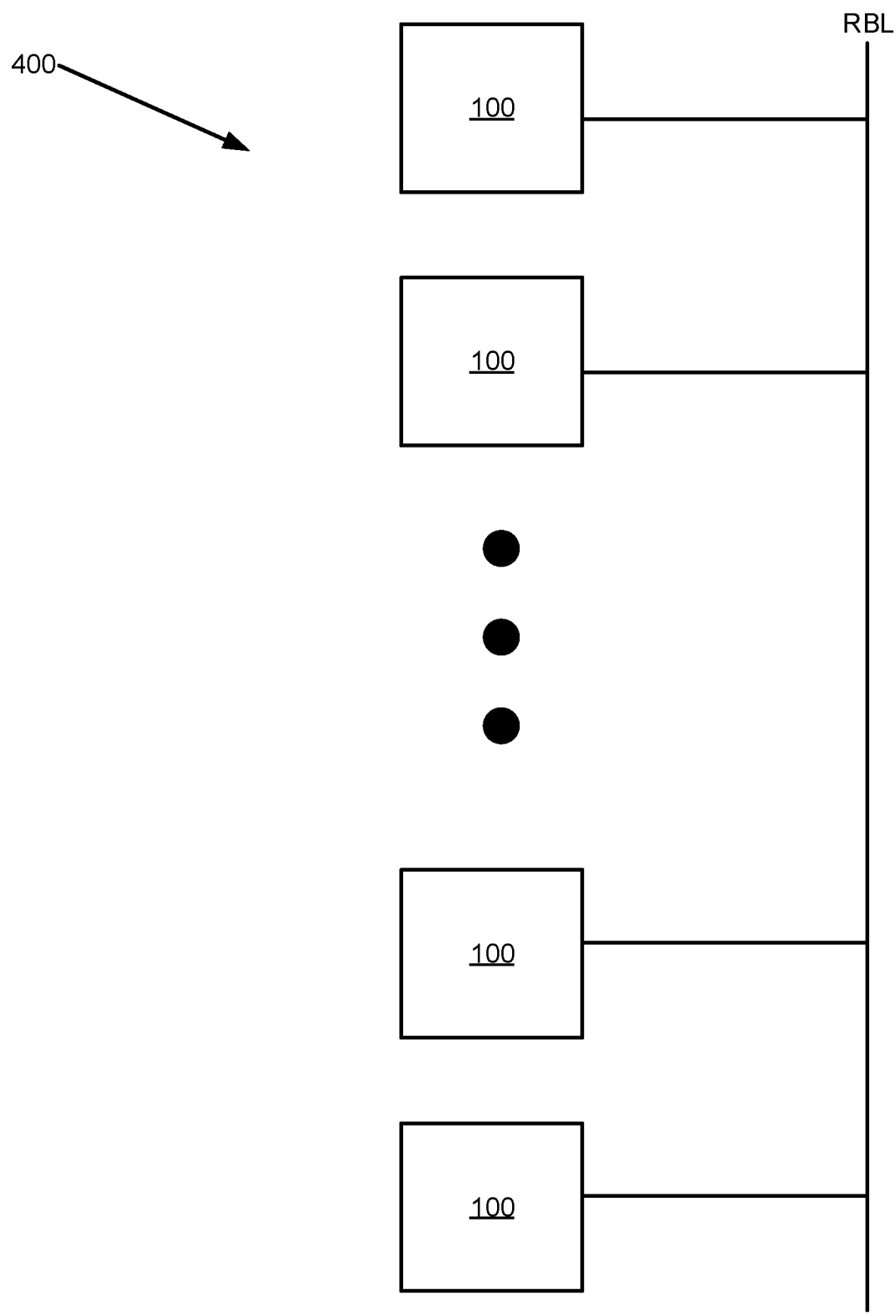
FIG. 4 illustrates a plurality of charge-pump-based current-mode neurons arranged to form a filter in accordance with an aspect of the disclosure.

A plurality of neurons 100 may be organized to form a filter. As discussed previously, a filter is a multiply-and-accumulate circuit that multiplies a plurality of filter weights with a corresponding plurality of input bits and that sums (accumulates) the results of the multiplication. An example filter 400 is shown in FIG. 4 that includes a plurality of neurons 100 all coupled to a common read bit line RBL. The common bias circuit is not shown in FIG. 4 for illustration clarity but may be arranged as discussed with regard to bias circuit 101.

Figure 5:
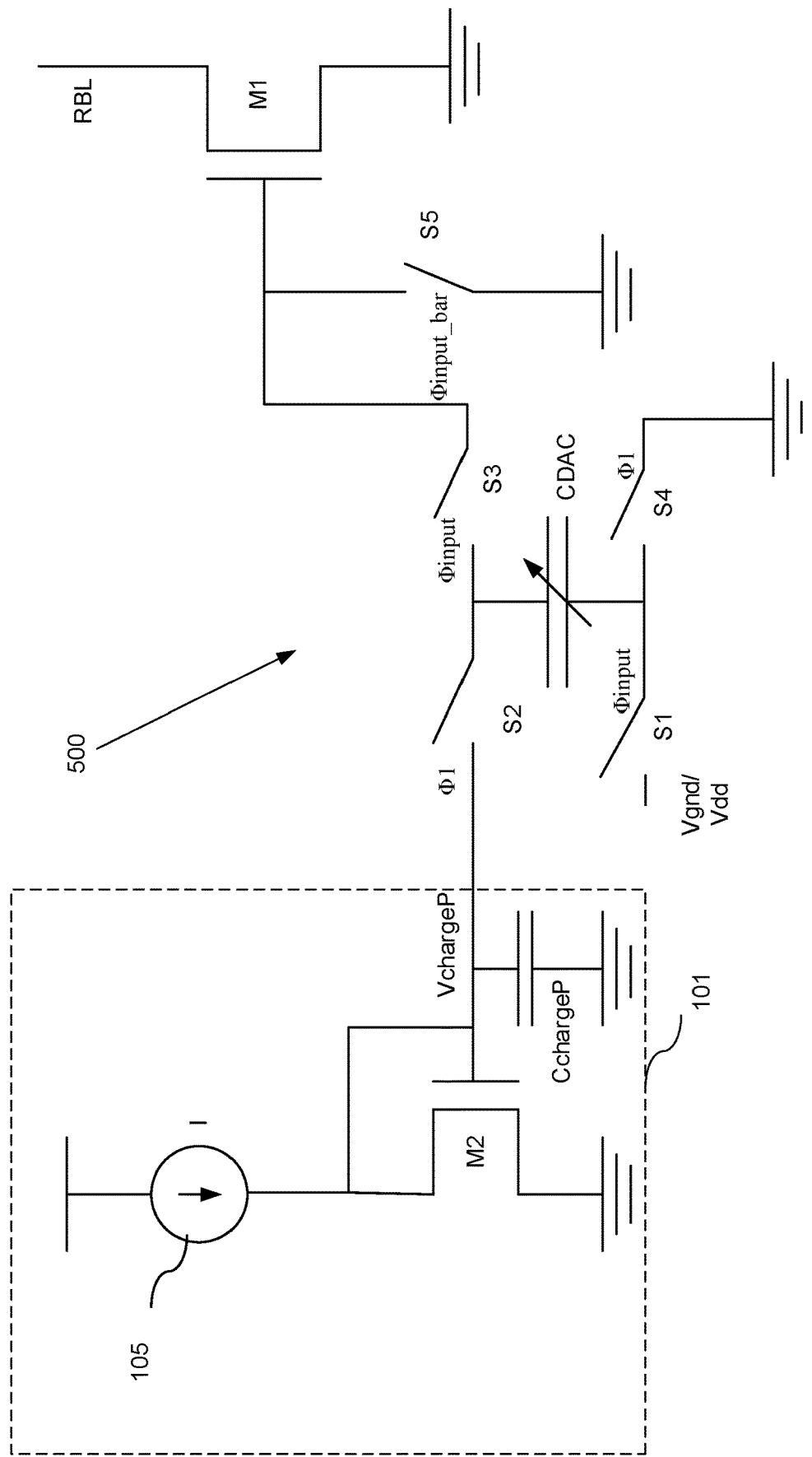
FIG. 5 illustrates a charge-pump-based current-mode neuron including a variable capacitor for storing a filter weight voltage in accordance with an aspect of the disclosure.

There are numerous alternative implementations for a charge-pump-based current-mode neuron as disclosed herein. For example, a neuron 500 is shown in FIG. 5 in which the filter weight capacitor is implemented using a capacitive digital-to-analog converter (CDAC) that functions as a variable capacitor. The CDAC is trained analogously as discussed for VDAC 110 such that no VDAC is needed for neuron 500. Bias circuit 101 functions as discussed with regard to neuron 100. Switch S2 couples between the first plate of the charge pump capacitor CchargeP to a first plate of the CDAC. Switch S4 couples between a second plate of the CDAC and ground. The control signal φ1 controls switches S2 and S4 to close during the charging stage so that the CDAC is charged to VchargeP. Switch S3 couples between the first plate of the CDAC and the gate of output transistor M1 analogously as discussed for neuron 100. During the computation phase, switch S1 may selectively couple to either ground or to a node for the power supply voltage Vdd depending upon the value of the input bit φinput. For example, if the input bit is binary high, switch S1 selects for Vdd so that the second plate of the CDAC is charged accordingly. The first plate of the CDAC is then pumped above CchargeP by a voltage that depends upon the CDAC setting as established during a training phase. Switch S5 functions as discussed for neuron 100.

Figure 6:
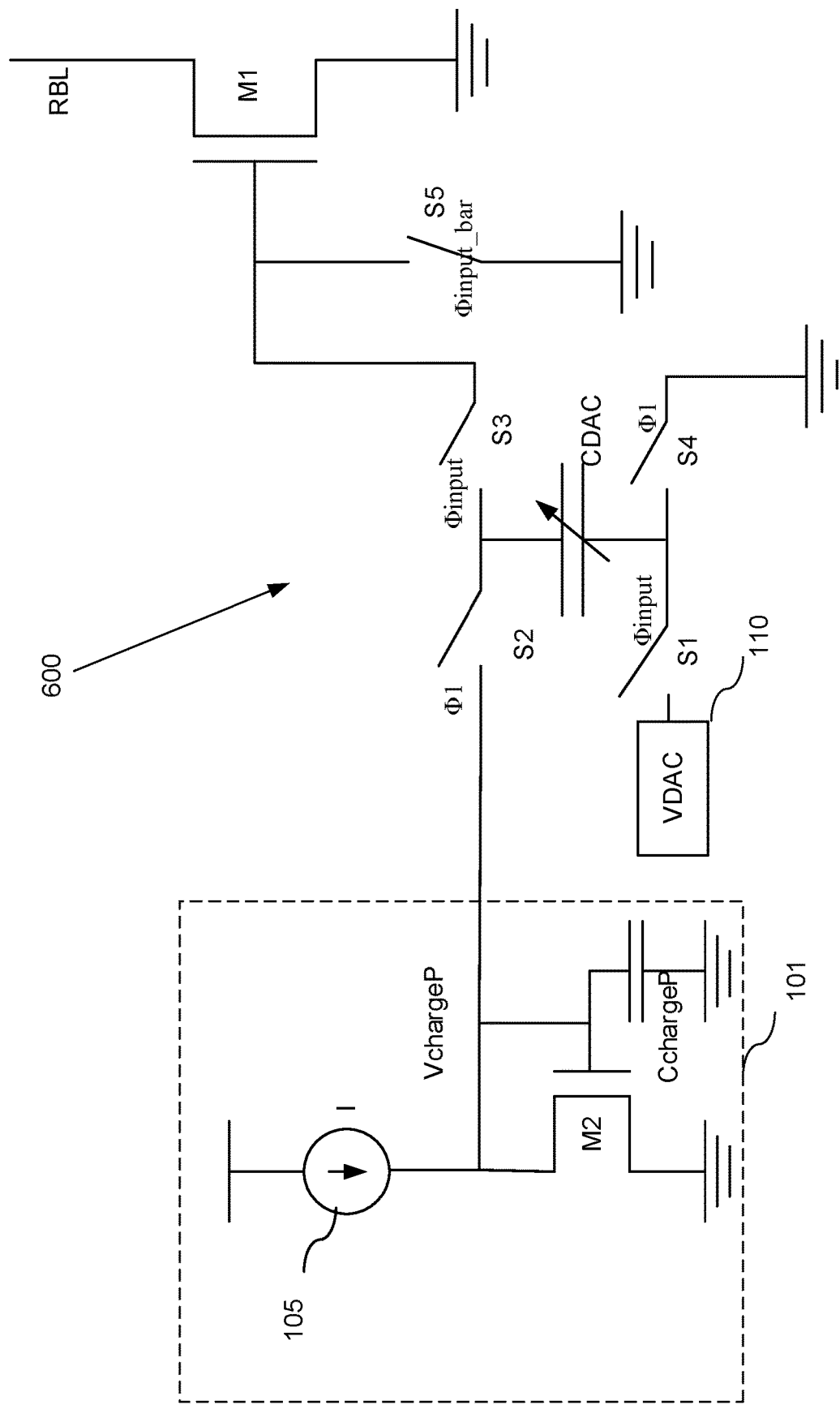
FIG. 6 illustrates a modification of the neuron of FIG. 5 to include a voltage-to-digital-analog-converter in accordance with an aspect of the disclosure.

For even greater flexibility, the CDAC may be combined with VDAC 110 as shown in FIG. 6 for a neuron 600. Bias circuit 101 is arranged as discussed for neuron 100. Switches S1 through S5 are arranged as discussed for neuron 500 except that switch S1 couples to VDAC 110.

Figure 7:
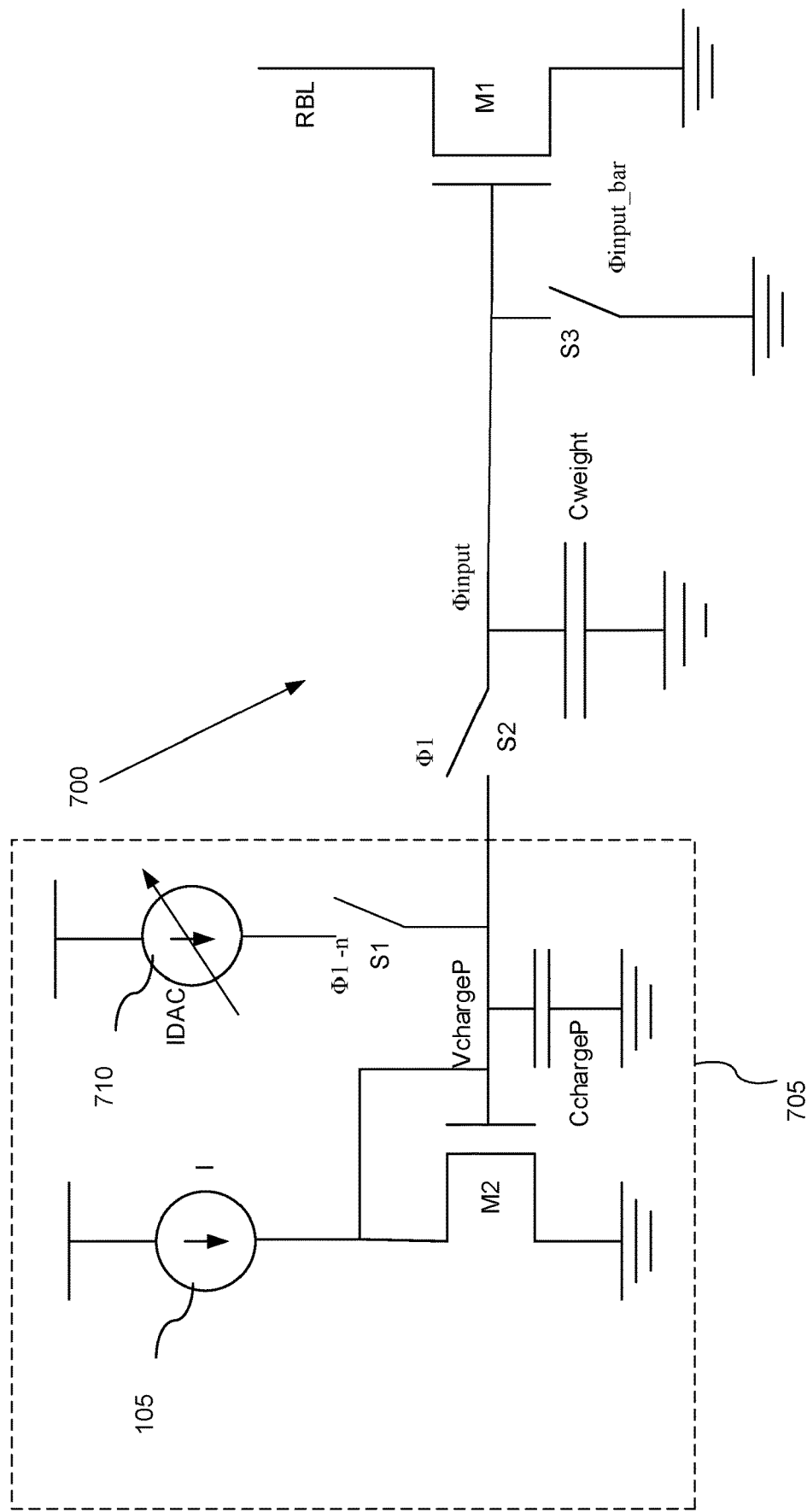
FIG. 7 illustrates a charge-pump-based current-mode neuron having a filter weight capacitor that is charged with a filter weight voltage by a current digital-to-analog converter in accordance with an aspect of the disclosure.

In yet another alternative implementation of neuron 100, the function of VDAC 100 may be implemented by a current DAC (IDAC) 710 as shown in FIG. 7. A common bias circuit 705 includes current source 105, diode-connected transistor M2, and the charge pump capacitor as discussed for bias circuit 101. The charge pump capacitor is thus charged to VchargeP by these circuit elements. In addition, bias circuit 705 includes IDAC 710 that couples to the first plate of the charge pump capacitor through switch S1. Switch S1 closes during a charging phase that is individual or unique to each neuron. If there are n neurons, switch S1 is thus responsive to n corresponding clock phases φ1-$n$. During training, the charge pump capacitor is thus charged to the equivalent of VchargeP+Vdac depending upon the setting for IDAC 710. A filter weight capacitor Cweight has a second plate connected to ground and a first plate coupled through switch S2 to the first plate of the charge pump capacitor. The first plate of the filter weight capacitor is also coupled to the gate of the output transistor M1. Switch S3 couples between the gate of the output transistor and ground. The control signal φ1 controls switch S2. Similarly, the complement input bit φinput_bar controls switch S3.

Figure 8:
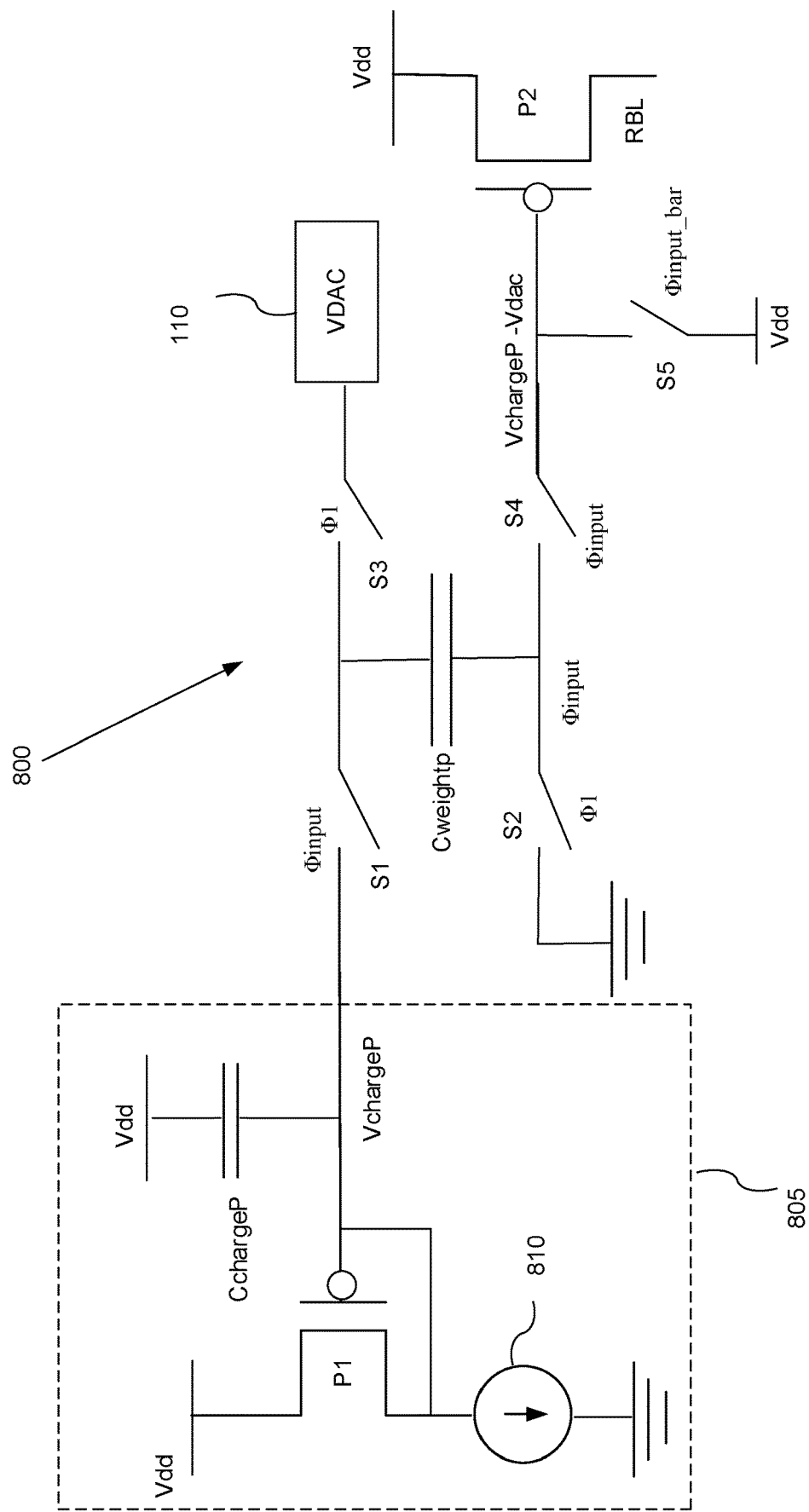
FIG. 8 illustrates a charge-pump-based current-mode neuron and bias circuit in which the output transistor is a PMOS transistor in accordance with an aspect of the disclosure.

In neurons 100, 500, 600, and 700, output transistor M1 and diode-connected transistor M2 are NMOS transistors. A PMOS implementation for these transistors is shown in FIG. 8 for a neuron 800 and bias circuit 805. Bias circuit includes a PMOS diode-connected transistor P1 having its drain coupled to ground through a current source 810. The source of diode-connected transistor P1 couples to a node for the power supply voltage Vdd. A charge pump capacitor CchargeP has a first plate coupled to the gate of the diode-connected transistor P1 and a second plate coupled to the power supply node. The first plate of the charge pump capacitor couples through switch S1 to a second plate of a filter weight capacitor CweightP. A first plate of the filter weight capacitor couples to ground through a switch S2 during the charging stage. VDAC 110 couples to the second plate of the filter weight capacitor through a switch S3 during the charging stage. The first plate of the filter weight capacitor couples to a gate of a PMOS output transistor P2 in the evaluation stage through a switch S4 depending upon the binary value of the input bit. The gate of the output transistor P2 also couples to a node for the power supply voltage through a switch S5 controlled by the complement of the input bit during the evaluation stage. Switches S2 and S3 close during the charging stage when the control signal φ1 is asserted to charge the filter weight capacitor to −Vdac. Switches S2 and S3 are opened after the charging stage. If the input bit φinput in the subsequent computation phase is binary high, switches S1 and S4 close so that the gate of the output transistor is charged to a boosted voltage VchargeP−Vdac. Neuron 800 thus serially stacks the filter weight and charge pump capacitors analogously as discussed for neuron 100. The output transistor P2 will then conduct a mirrored version of the current conducted by current source 810. The proportionality of this mirrored current to the current conducted by current source 810 depends the boosted voltage VchargeP−Vdac. The read bit line couples to the drain of the output transistor P2 and is discharged (or partially discharged) prior to the computation phase. The read bit line voltage will thus rise from ground or this partial voltage stage due to the conduction of the mirrored current. If the input bit is a binary zero during the evaluation stage, switch S5 closes to switch off transistor P2 and float the read bit line.

Figure 9:
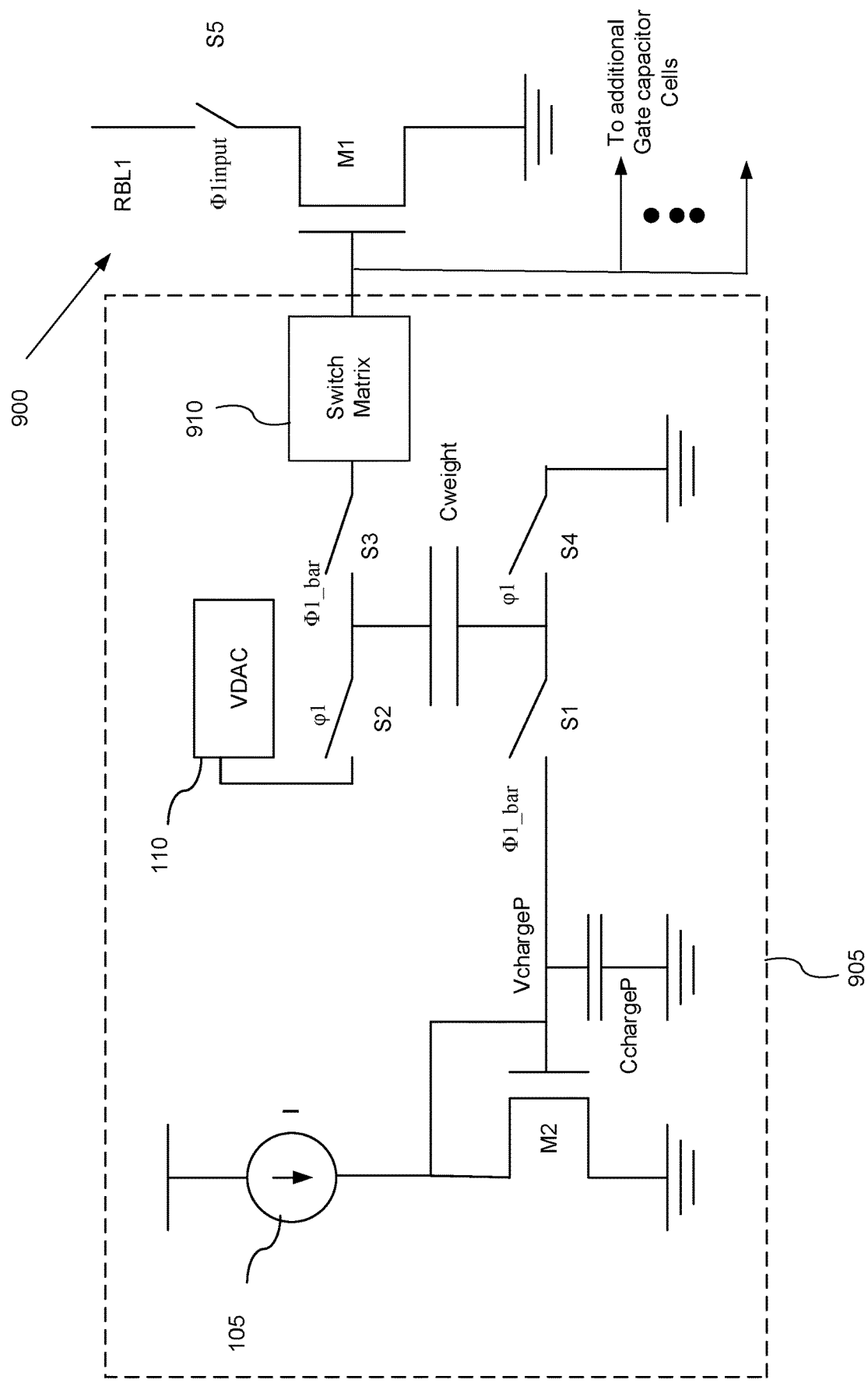
FIG. 9 illustrates an array of charge-pump-based current-mode neurons and a common bias circuit in which a gate capacitance of an output transistor in each neuron is configured to function as a filter weight capacitor and in which the bias circuit includes a VDAC in accordance with an aspect of the disclosure.

The separate filter weight capacitor discussed for neurons 100, 500, 600, 700, and 800 may be eliminated in alternative implementations in which a gate capacitance for the output transistor functions as the filter weight capacitor. An example neuron 900 is shown in FIG. 9. A common bias circuit 905 includes a charge source such as a VDAC 110, switches S1 through S4, the filter weight capacitor, current source 105, diode-connected transistor M2 and the charge pump capacitor all arranged as discussed for neuron 100. But neuron 900 includes just the output transistor M1 and a bit line switch S5 coupled between the drain of output transistor M1 and the read bit line. During the charging stage, switches S2 and S4 close so that the filter weight capacitor may be charged to Vdac. During the evaluation stage, switches S1 and S3 close and switches S2 and S4 open so that the filter weight capacitor is charged to the boosted voltage VchargeP+Vdac.

Although bias circuit 905 is common to a plurality of neurons, VDAC 110 is set to whatever value is appropriate as determined by the training phase for a particular neuron. To apply the resulting boosted voltage VchargeP+Vdac to the gate of the output transistor M1 in a selected neuron, the first plate of the filter weight capacitor couples through switch S3 (which is closed following the pulsing of control signal φ1) and a switch matrix 910 to the gate of the selected neuron's output transistor M2. In FIG. 9, the additional neurons besides neuron 900 are not shown for illustration clarity. But each neuron's output transistor's gate may couple through switch matrix 910 to the filter weight capacitor. The gate capacitance for the selected output transistor M1 is thus charged to the boosted voltage VchargeP+Vdac during the charging stage. In a subsequent computation phase for neuron 900, switch matrix 910 is configured so as to isolate the gate of output transistor from the filer weight capacitor. Depending upon the input bit value, switch S5 is either open or closed. If switch S5 is closed, output transistor M1 conducts the mirrored current though the read bit line as discussed for neuron 100.

Figure 10:
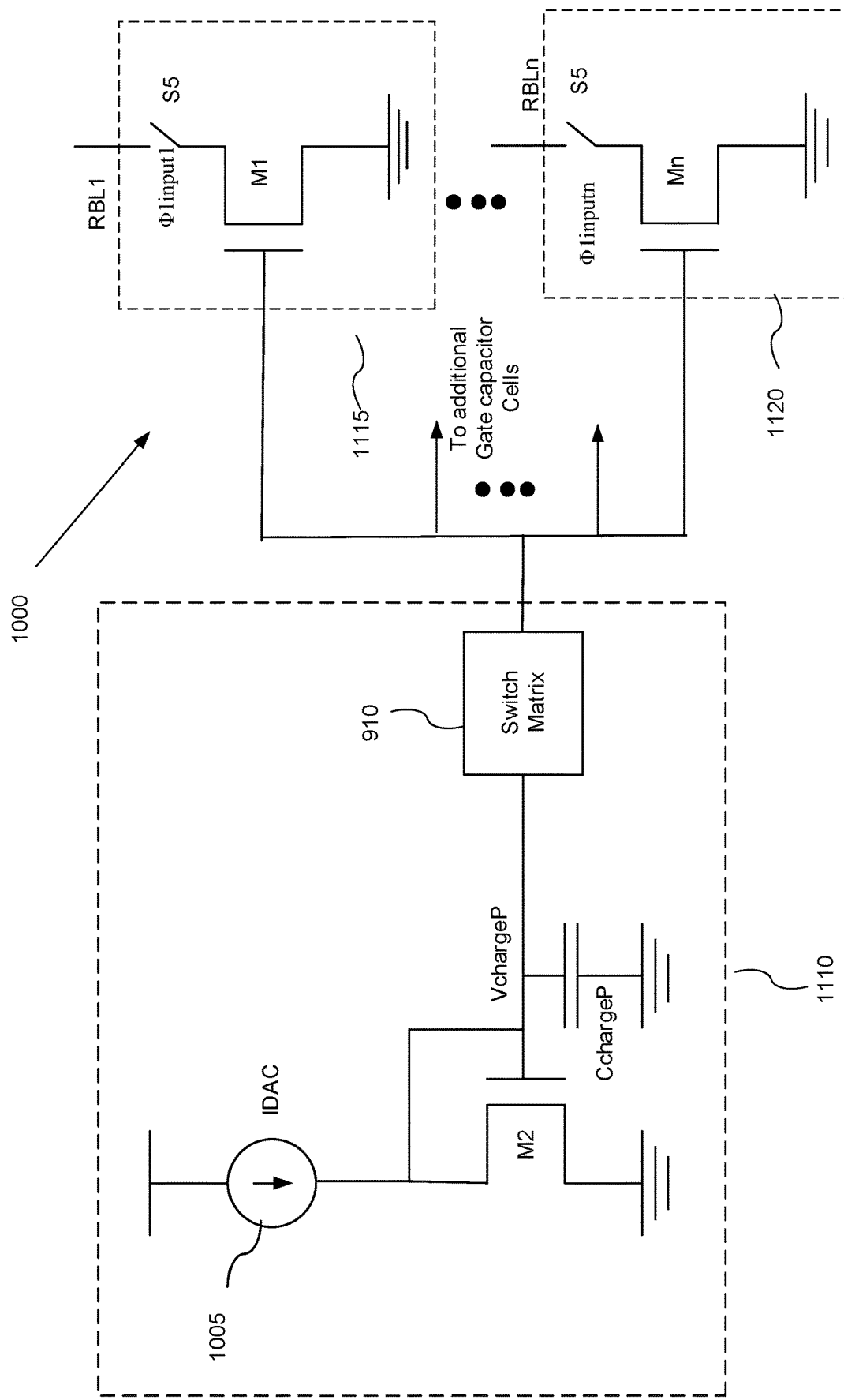
FIG. 10 illustrates an array of charge-pump-based current-mode neurons and a common bias circuit in which a gate capacitance of an output transistor in each neuron is configured to function as a filter weight capacitor and in which the bias circuit includes an IDAC in accordance with an aspect of the disclosure.

Since neuron 900 uses its gate capacitance to function as the filter weight capacitor, neuron 900 may also be denoted as a gate capacitor cell. The bias circuit for such gate capacitor cells may be implemented in a variety of alternative implementations. For example, a bias circuit 1110 may bias an array 1000 of gate capacitor cells through switch matrix 910 as shown in FIG. 10. An IDAC 1005 in bias circuit 1110 is trained during the training phase analogously as discussed for VDAC 110. IDAC 1005 drives the drain of the diode-connected transistor M2. A first plate of a charge pump capacitor couples to the gate of the diode-connected transistor and through switch matrix 910 to a gate of a selected output transistor. During the charging state, the filter weight capacitor is then charged to a voltage VchargeP that depends upon the training of IDAC 1005. Array 1000 includes n gate capacitor cells ranging from a first gate capacitor cell 1115 to an nth gate capacitor cell 1120. Each neuron/gate capacitor cell is arranged as discussed with regard to neuron 900.

During the charging stage, switch matrix 910 is configured so that the gate of the selected neuron's output transistor couples to the charged filter weight capacitor. The gate capacitance of the selected output transistor is then charged accordingly so that a mirrored current is drawn from the corresponding read bit line during the evaluation stage depending upon the value of the input bit for the selected neuron. For example, the bit line switch S5 in neuron 1115 is controlled by an input bit φinput1. Similarly, an input bit φinputn controls bit line switch S5 in neuron 1120.

Figure 11:
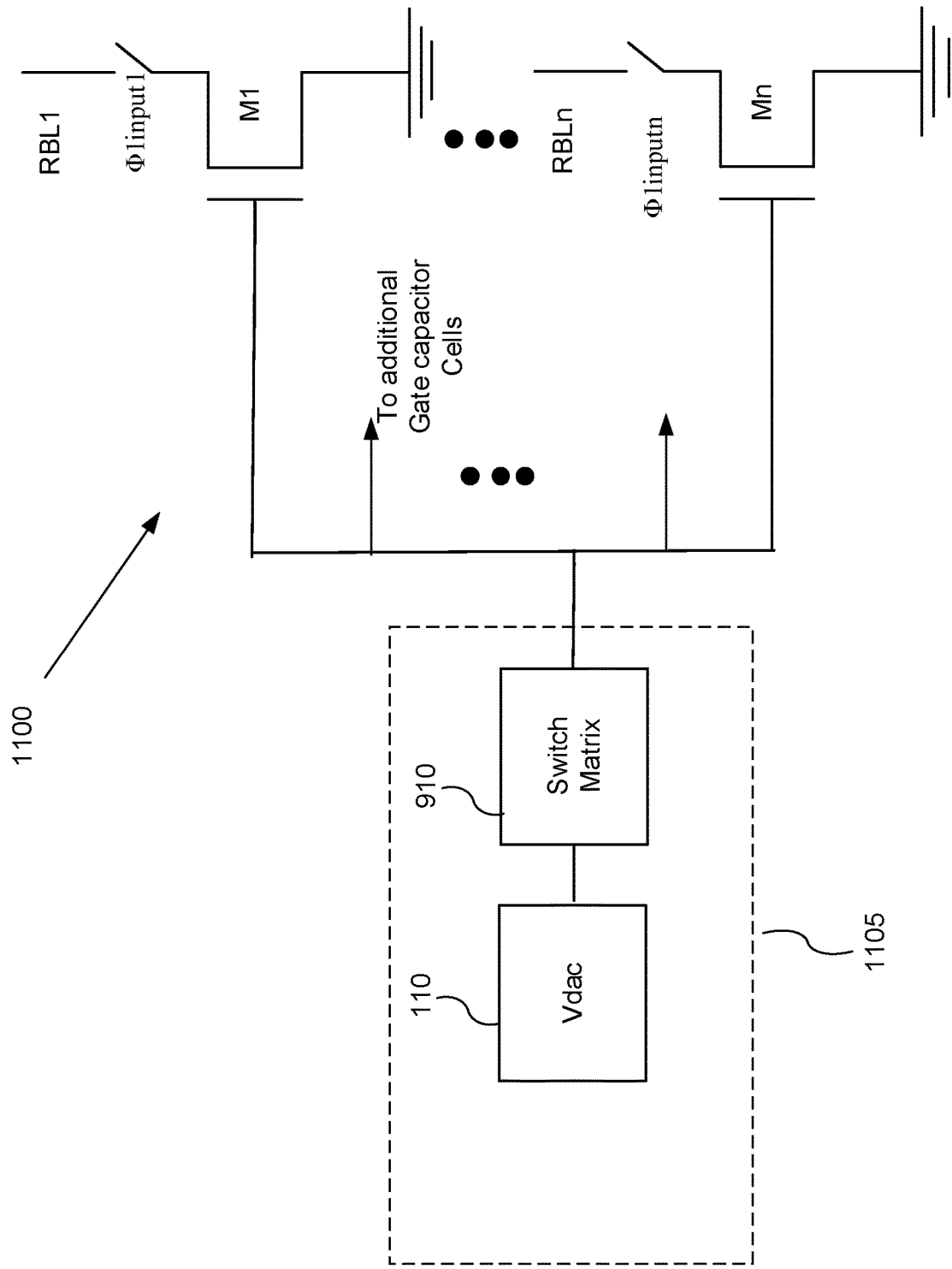
FIG. 11 illustrates an array of current-mode neurons and a common bias circuit in which a gate capacitance of an output transistor in each neuron is configured to function as a filter weight capacitor and in which the bias circuit includes only a VDAC and a switch matrix in accordance with an aspect of the disclosure.

In yet another gate capacitor cell implementation, a bias circuit 1105 may include only a charge source such as VDAC 110 and switch matrix 910 as shown in FIG. 11. Vdac 110 is trained during the training phase to provide the appropriate Vdac voltage. During an evaluation stage, the resulting Vdac voltage couples through switch matrix 910 to a selected neuron from a gate capacitor cell array 1100. Each neuron is implemented as discussed for array 1000.

Figure 12:
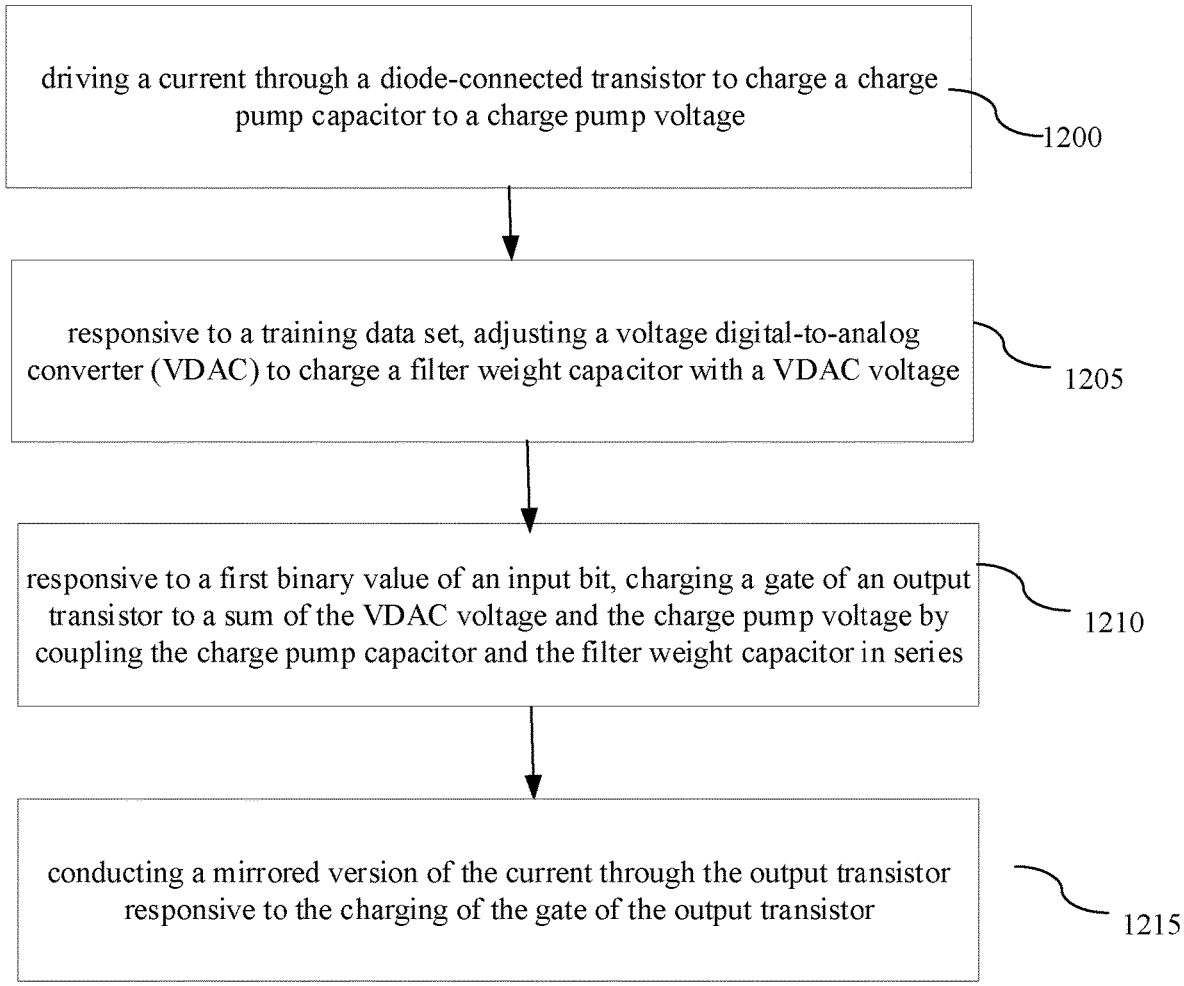
FIG. 12 is a flowchart for an example method of operation for a charge-pump-based current-mode circuit in accordance with an aspect of the disclosure.

A method of operation for a charge-pump-based current-mode neuron will now be discussed with regard to the flowchart of FIG. 12. The method includes an act 1200 of driving a current through a diode-connected transistor to charge a charge pump capacitor to a charge pump voltage. The charging of the charge pump capacitor in bias circuits 101, 305, and 805 is an example of act 1200. The method further includes an act 1205 that is responsive to a training data set and includes adjusting a voltage digital-to-analog converter (VDAC) to charge a filter weight capacitor with a VDAC voltage. The operation of VDAC 110 during the evaluation stage of the training phase in neurons 100, 800 and in bias circuit 1110 is an example of act 1205. In addition, the method includes an act 1210 that is responsive to a first binary value of an input bit and includes coupling the charge pump capacitor and the filter weight capacitor in series to charge a gate of an output transistor to a sum of the VDAC voltage and the charge pump voltage. The second switching configuration of neuron 100 and the equivalent switching configuration for neuron 800 are examples of act 1210. Finally, the method includes an act 1215 of conducting a mirrored version of the current through the output transistor responsive to the charging of the gate of the output transistor. The conduction by output transistor M1 in neuron 100 or output transistor P2 in neuron 800 is an example of act 1215.

The disclosure will now be summarized through the following example clauses:

Clause 1. A memory for machine learning, comprising:
  a bias circuit;
  a bit line; and
  a neuron including:
    an output transistor having a drain connected to the bit line;
    a filter weight capacitor;
    a digital-to-analog converter;
    a first switch coupled between the bias circuit and the filter weight capacitor;
    a second switch coupled between the digital-to-analog converter and the filter weight capacitor; and
    a third switch coupled between the filter weight capacitor and a gate of the output transistor.

Clause 2. The memory of clause 1, wherein the neuron further includes:
  a fourth switch coupled between ground and the filter weight capacitor.

Clause 3. The memory of clause 2, wherein the neuron further includes:
  a fifth switch coupled between ground and the gate of the output transistor.

Clause 4. The memory of any of clauses 1-3, wherein output transistor is an n-type metal-oxide-semiconductor (NMOS) transistor.

Clause 5. The memory of any of clauses 1, wherein the bias circuit includes:
a diode-connected transistor;
a charge pump capacitor coupled to a gate of the diode-connected transistor; and
a current source coupled to a drain of the diode-connected transistor.

Clause 6. The memory of clause 5, wherein the diode-connected transistor comprises an NMOS diode-connected transistor.

Clause 7. The memory of any of clauses 1-6, wherein the filter weight capacitor includes a first plate and a second plate, the first switch is coupled between the second plate and the bias circuit and the second switch is coupled between the first plate and the digital-to-analog converter, and the third switch is coupled between the first plate and the gate of the output transistor.

Clause 8. The memory of any of clause 1, wherein the filter weight capacitor comprises a capacitive digital-to-analog converter.

Clause 9. The memory of claim 8, wherein the capacitive digital-to-analog converter includes a first plate and a second plate, and wherein the first switch is coupled between the first plate and the bias circuit, the second switch is coupled between the second plate and the digital-to-analog converter, and the third switch is coupled between the first plate and the gate of the output transistor.

Clause 10. The memory of clause 1, wherein the output transistor comprises a p-type metal-oxide-semiconductor (PMOS) output transistor.

Clause 11. The memory of clause 10, wherein the filter weight capacitor includes a first plate and a second plate, the first switch being coupled between the second plate and the bias circuit, the second switch being coupled between the second plate and the digital-to-analog converter, the third switch being coupled between the first plate and the gate of the output transistor, the neuron further including:
a fourth switch coupled between the first plate and ground; and
a fifth switch coupled between the gate of the output transistor and a node for a power supply voltage.

Clause 12. A memory for a machine learning application, comprising:
a read bit line;
an output transistor having a drain connected to the read bit line;
a charge pump capacitor;
a filter weight capacitor;
a voltage source; and
a set of switches having a first switching configuration in which the filter weight capacitor is charged by the voltage source and having a second switching configuration in which the filter weight capacitor is coupled to the charge pump capacitor to provide a boosted voltage to a gate of the output transistor.

Clause 13. The memory of clause 12, further comprising:
a bias circuit including the charge pump capacitor and a current source, wherein the current source is configured to charge the charge pump capacitor to a bias voltage, and wherein the voltage source comprises a voltage digital-to-analog converter.

Clause 14. The memory of clause 13, wherein the set of switches further includes a third switching configuration in which the output transistor is switched off.

Clause 15. The memory of clause 14, wherein the second switching configuration is responsive to an input bit being true and the third switching configuration is responsive to the input bit being false.

Clause 16. The memory of any of clauses 13-15, wherein bias circuit further includes a diode-connected transistor having a drain connected to the current source and a gate connected to the charge pump capacitor.

Clause 17. The memory of clause 16, wherein the diode-connected transistor is a PMOS transistor having a source connected to a node for a power supply voltage.

Clause 18. The memory of clause 16, wherein the diode-connected transistor is an NMOS transistor having a source connected to ground.

Clause 19. A memory for a machine learning application, comprising:
a plurality of neurons, each neuron including:
a bit line;
a bit line switch; and
an output transistor having a terminal connected to the bit line through
the bit line switch; and
a bias circuit including:
a charge source; and a
a switch matrix configured to couple the charge source to a selected one of the neurons to charge a gate capacitance in the output transistor of the selected one of the neurons with a boosted voltage.

Clause 20. The clause of claim 19, wherein each bit line switch is configured to close responsive to a binary state of a respective input bit.

Clause 21. The clause of claim 19, wherein the bias circuit further comprises a current digital-to-analog converter configured to charge a charge pump capacitor with the boosted voltage.

Clause 22. The memory of clause 21, wherein the bias circuit further includes:
a diode-connected transistor having a gate and a drain coupled to the current digital-to-analog converter.

Clause 23. The memory of claim 19, wherein the charge source comprises:
a filter weight capacitor;
a digital-to-analog converter; and
a set of switches having a first switching configuration in which the filter weight capacitor is charged by the digital-to-analog converter and having a second switching configuration in which the filter weight capacitor is coupled to a charge pump capacitor to provide the boosted voltage to the switch matrix.

Clause 24. The memory of clause 23, wherein the bias circuit further includes:
a diode-connected transistor having a gate coupled to the charge pump capacitor.

Clause 25. The memory of clause 24, wherein the bias circuit further includes:
a current source configured to drive a current into a drain of the diode-connected transistor.

Clause 26. A method of operation for a neuron, comprising:
driving a current through a diode-connected transistor to charge a charge pump capacitor to a charge pump voltage;

responsive to a training data set, adjusting a voltage of a digital-to-analog converter (VDAC) to charge a filter weight capacitor with a VDAC voltage;
responsive to a first binary value of an input bit, coupling the charge pump capacitor and the filter weight capacitor in series to charge a gate of an output transistor to a sum of the VDAC voltage and the charge pump voltage; and
conducting a mirrored version of the current through the output transistor responsive to the charging of the gate of the output transistor.

Clause 27. The method of clause 26, wherein charging the filter weight capacitor with the VDAC voltage further comprises switching on a first switch to couple a first plate of the filter weight capacitor to the voltage digital-to-analog converter and switching on a second switch to ground a second plate of the filter weight capacitor.

Clause 28. The method of clause 26, further comprising: responsive to a second binary value of the input bit, switching off the output transistor.

Clause 29. The method of clause 28, wherein switching off the output transistor comprises grounding the gate of the output transistor.

Clause 30. The method of clause 28, wherein switching off the output transistor comprises charging the gate of the output transistor to a power supply voltage.

It will be appreciated that many modifications, substitutions and variations can be made in and to the materials, apparatus, configurations and methods of use of the devices of the present disclosure without departing from the scope thereof. In light of this, the scope of the present disclosure should not be limited to that of the particular implementations illustrated and described herein, as they are merely by way of some examples thereof, but rather, should be fully commensurate with that of the claims appended hereafter and their functional equivalents.

We claim:

1. A memory for machine learning, comprising:
   a bias circuit;
   a bit line; and
   a neuron including:
      an output transistor having a drain connected to the bit line;
      a filter weight capacitor;
      a digital-to-analog converter;
      a first switch coupled between the bias circuit and the filter weight capacitor;
      a second switch coupled between the digital-to-analog converter and the filter weight capacitor; and
      a third switch coupled between the filter weight capacitor and a gate of the output transistor,
   wherein the bias circuit includes:
      a diode-connected transistor;
      a charge pump capacitor coupled to a gate of the diode-connected transistor; and
      a current source coupled to a drain of the diode-connected transistor.

2. The memory of claim 1, wherein the neuron further includes:
   a fourth switch coupled between ground and the filter weight capacitor.

3. The memory of claim 2, wherein the neuron further includes:
   a fifth switch coupled between ground and the gate of the output transistor.

4. The memory of claim 1, wherein output transistor is an n-type metal-oxide-semiconductor (NMOS) transistor.

5. The memory of claim 1, wherein the diode-connected transistor comprises an NMOS diode-connected transistor.

6. The memory of claim 1, wherein the filter weight capacitor includes a first plate and a second plate, the first switch is coupled between the second plate and the bias circuit and the second switch is coupled between the first plate and the digital-to-analog converter, and the third switch is coupled between the first plate and the gate of the output transistor.

7. The memory of claim 1, wherein the filter weight capacitor comprises a capacitive digital-to-analog converter.

8. The memory of claim 7, wherein the capacitive digital-to-analog converter includes a first plate and a second plate, and wherein the first switch is coupled between the first plate and the bias circuit, the second switch is coupled between the second plate and the digital-to-analog converter, and the third switch is coupled between the first plate and the gate of the output transistor.

9. The memory of claim 1, wherein the output transistor comprises a p-type metal-oxide-semiconductor (PMOS) output transistor.

10. The memory of claim 9, wherein the filter weight capacitor includes a first plate and a second plate, the first switch being coupled between the second plate and the bias circuit, the second switch being coupled between the second plate and the digital-to-analog converter, the third switch being coupled between the first plate and the gate of the output transistor, the neuron further including:
    a fourth switch coupled between the first plate and ground; and
    a fifth switch coupled between the gate of the output transistor and a node for a power supply voltage.

11. A memory for a machine learning application, comprising:
    a read bit line;
    an output transistor having a drain connected to the read bit line;
    a charge pump capacitor;
    a filter weight capacitor;
    a voltage source;
    a set of switches having a first switching configuration in which the filter weight capacitor is charged by the voltage source and having a second switching configuration in which the filter weight capacitor is coupled to the charge pump capacitor to provide a boosted voltage to a gate of the output transistor; and
    a bias circuit including the charge pump capacitor and a current source, wherein the current source is configured to charge the charge pump capacitor to a bias voltage, and wherein the voltage source comprises a voltage digital-to-analog converter.

12. The memory of claim 11, wherein the set of switches further includes a third switching configuration in which the output transistor is switched off.

13. The memory of claim 12, wherein the second switching configuration is responsive to an input bit being true and the third switching configuration is responsive to the input bit being false.

14. The memory of claim 11, wherein bias circuit further includes a diode-connected transistor having a drain connected to the current source and a gate connected to the charge pump capacitor.

15. The memory of claim 14, wherein the diode-connected transistor is a PMOS transistor having a source connected to a node for a power supply voltage.

16. The memory of claim 14, wherein the diode-connected transistor is an NMOS transistor having a source connected to ground.

17. A memory for a machine learning application, comprising:
a plurality of neurons, each neuron including:
an bit line;
a bit line switch; and
an output transistor having a terminal connected to the bit line through the bit line switch; and
a bias circuit including a switch matrix configured to couple a charge source to a selected one of the neurons to charge a gate capacitance in the output transistor of the selected one of the neurons with a boosted voltage.

18. The memory of claim 17, wherein each bit line switch is configured to close responsive to a binary state of a respective input bit.

19. The memory of claim 17, wherein the charge source comprises a current digital-to-analog converter configured to charge a charge pump capacitor with the boosted voltage.

20. The memory of claim 19, wherein the bias circuit further includes:
a diode-connected transistor having a gate and a drain coupled to the current digital-to-analog converter.

21. The memory of claim 17, wherein the charge source comprises:
a filter weight capacitor;
a digital-to-analog converter; and
a set of switches having a first switching configuration in which the filter weight capacitor is charged by the digital-to-analog converter and having a second switching configuration in which the filter weight capacitor is coupled to a charge pump capacitor to provide the boosted voltage to the switch matrix.

22. The memory of claim 21, wherein the bias circuit further includes:
a diode-connected transistor having a gate coupled to the charge pump capacitor.

23. The memory of claim 22, wherein the bias circuit further includes:
a current source configured to drive a current into a drain of the diode-connected transistor.

24. A method of operation for a neuron, comprising:
driving a current through a diode-connected transistor to charge a charge pump capacitor to a charge pump voltage;
responsive to a training data set, adjusting a voltage digital-to-analog converter (VDAC) to charge a filter weight capacitor with a VDAC voltage;
responsive to a first binary value of an input bit, coupling the charge pump capacitor and the filter weight capacitor in series to charge a gate of an output transistor to a sum of the VDAC voltage and the charge pump voltage; and
conducting a mirrored version of the current through the output transistor responsive to the charging of the gate of the output transistor.

25. The method of claim 24, wherein charging the filter weight capacitor with the VDAC voltage further comprises switching on a first switch to couple a first plate of the filter weight capacitor to the voltage digital-to-analog converter and switching on a second switch to ground a second plate of the filter weight capacitor.

26. The method of claim 24, further comprising:
responsive to a second binary value of the input bit, switching off the output transistor.

27. The method of claim 26, wherein switching off the output transistor comprises grounding the gate of the output transistor.

28. The method of claim 26, wherein switching off the output transistor comprises charging the gate of the output transistor to a power supply voltage.

* * * * *